(12) United States Patent
Childress et al.

(10) Patent No.: US 8,739,391 B2
(45) Date of Patent: Jun. 3, 2014

(54) SILVER ALLOY ELECTRICAL LAPPING GUIDES (ELGS) FOR FABRICATION OF DISK DRIVE SLIDERS WITH MAGNETORESISTIVE SENSORS

(75) Inventors: Jeffrey R. Childress, San Jose, CA (US); David Patrick Druist, Santa Clara, CA (US); John Creighton Read, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 232 days.

(21) Appl. No.: 13/238,838

(22) Filed: Sep. 21, 2011

(65) Prior Publication Data

US 2013/0070371 A1    Mar. 21, 2013

(51) Int. Cl.
*B23P 19/00*        (2006.01)
*G11C 5/12*         (2006.01)

(52) U.S. Cl.
USPC .......................................................... 29/737

(58) Field of Classification Search
USPC ............................. 29/737; 360/55, 110, 316
See application file for complete search history.

(56) References Cited

U.S. PATENT DOCUMENTS 7,287,316 B2 * 10/2007 Kasahara et al. ................ 29/737
8,270,260 B2 *  9/2012 Okada et al. ................ 369/13.33
8,411,393 B2 *  4/2013 Zou et al. ...................... 360/316
2007/0070543 A1 *  3/2007 Gunder et al. ................ 360/126
2009/0154009 A1 *  6/2009 Le ................................. 360/110
2010/0157745 A1 *  6/2010 Okada et al. ............... 369/13.02
2010/0321814 A1 * 12/2010 Zou et al. ......................... 360/59
2013/0070371 A1 *  3/2013 Childress et al. .......... 360/235.4

OTHER PUBLICATIONS

Pratt Jr. et al, "Giant magnetoresistance with current perpendicular to the layer planes of Ag/Co and AgSn/Co multilayers (invited)," J. Appl. Phys. 73 (10), May 15, 1993, pp. 5326-5331.*
Pratt et al., "Giant magnetoresistance with current perpendicular to the layer planes of Ag/Co and AgSn/Co multilayers (invited)", J. Appl. Phys. 73 (10), May 15, 1993, pp. 5326-5331.

* cited by examiner

*Primary Examiner* — David Angwin
(74) *Attorney, Agent, or Firm* — Thomas R. Berthold

(57) ABSTRACT

An air-bearing slider used in a magnetic recording disk drive has a surface that supports a magnetoresistive (MR) read head or sensor and an electrical lapping guide (ELG) adjacent to the MR sensor. The ELG is formed of a different material than the MR sensor so as to have both a high electrical resistivity and a substantially higher etch rate. When the ELG and MR sensor are etched simultaneously to form their respective back edges, the ELG will have a sharp well-defined non-tapered wall at the back edge. The ELG has a film thickness close to but generally thinner than that of the MR sensor, and a sheet resistance to generally match the resistance measurement capability of the lapping tool. The preferred material for the ELG is an alloy comprising silver (Ag) and one or more of Sn, Ge and zinc Zn.

2 Claims, 6 Drawing Sheets

SILVER ALLOY ELECTRICAL LAPPING GUIDES (ELGS) FOR FABRICATION OF DISK DRIVE SLIDERS WITH MAGNETORESISTIVE SENSORS

TECHNICAL FIELD

This invention relates generally to sliders that support the read/write heads in magnetic recording disk drives, and more particularly to the electrical lapping guide on the slider for controlling the stripe height of the magnetoresistive read sensor during fabrication of the slider.

BACKGROUND OF THE INVENTION

In conventional magnetic recording disk drives, each read/write head, which includes a magnetoresistive (MR) read head or sensor and an inductive write head, is located on an air-bearing slider that is maintained in close proximity to its associated disk surface as the disks rotate. The MR read sensor and inductive write head are fabricated by deposition and lithographic patterning of a series of thin films on a wafer containing a large number, e.g., 40,000, of rectangular regions arranged in rows, with each region ultimately becoming an individual slider. After formation of the read/write heads at the wafer level, the wafer is cut into bars. The bars are then "lapped" in a plane perpendicular to the wafer surface, with this plane becoming the slider's air-bearing surface (ABS). The bars are then cut into the individual sliders.

The lapping is typically performed as a wet grinding process in which material is removed to reach the ABS. Electrical lapping guides (ELGs) are used to monitor the lapping. Generally, ELGs are formed in the areas of the wafer between the read/write heads. Each ELG includes an electrically conductive structure whose ends are connected to leads that carry current from a control circuit. Each completed MR sensor is a stack of multiple layers and is required to have a precise shape, including a precise track width (TW) and a precise stripe height (SH). The TW is defined during the MR sensor patterning process on the wafer surface, but the SH is defined by the lapping process. The lapping is controlled by monitoring the resistance of the ELGs as material is removed in the grinding process to assure the precise SH of the MR sensor. Thus, a predetermined resistance measurement of the ELG corresponds to the desired MR sensor SH.

Typically the ELG is formed of the same set of multilayered materials and at the same time as the MR sensor to simplify the manufacturing process. Because the ELG and MR sensor are formed of the same materials and in the same process, they will have the same thickness and same electrical resistivity. It is advantageous for the ELG film to have a sheet resistance well matched to the slider fabrication lapping equipment, typically 20-30 Ω/square. Thus the resistivity of the ELG material determines the thickness of the ELG film that will result in such a sheet resistance. Also, because the ELG and MR sensor back edges, i.e., the edges recessed from the lapping surface, are formed at the same time in the same etching step, the ELG and MR sensor back edges will have the same profile if they are made from the same materials and have the same thicknesses. A tapered back edge is desirable for the MR sensor, but results in an unpredictable surface area for the ELG. Because the current through the ELG is in the plane of the ELG this can result in a unpredictable electrical resistance. In order for the back edge of the ELG to be flat, i.e., generally orthogonal to the plane of the ELG film, and thus result in a predictable electrical resistance, the ELG film must be thinner than the sensor stack or have a substantially higher etching rate. To facilitate processing, the ELG film preferably has a thickness substantially similar to or slightly thinner than the sensor stack.

What is needed is a high resistance ELG with an etch rate substantially greater than the etch rate of the stack of layers making up the MR sensor so that a non-tapered flat ELG back edge can be achieved, while providing the needed sheet resistance at a film thickness substantially similar to the thickness of the sensor stack.

SUMMARY OF THE INVENTION

The invention relates to an ELG that is formed of a different material than the MR sensor so as to have both a high electrical resistivity and a substantially higher etch rate. Because the ELG material has a substantially higher rate of etching than the material of the MR sensor, when the ELG and MR sensor are etched simultaneously to form their respective back edges, the ELG will have a sharp well-defined non-tapered wall at the back edge. The ELG has a film thickness close to but generally thinner than that of the MR sensor, and a sheet resistance to generally match the resistance measurement capability of the lapping tool. The ELG material also has a low temperature coefficient of resistivity, which results in a stable resistance measurement during heating caused by the lapping process, and a high corrosion resistance, which prevents corrosion during the wet lapping process. The preferred material for the ELG is an alloy comprising silver (Ag) and tin (Sn), with the amount of Sn being between about 3 and 20 atomic percent. Other elements may be substituted for Sn or added to Sn, such as one or more of Sn, germanium (Ge) and zinc (Zn).

For a fuller understanding of the nature and advantages of the present invention, reference should be made to the following detailed description taken together with the accompanying figures.

DETAILED DESCRIPTION OF THE INVENTION

For sliders used in conventional magnetic recording disk drives, the films making up the read and write heads are deposited on a wafer containing a large number, e.g., 40,000, of rectangular regions arranged in rows or bars, with each region ultimately becoming an individual slider and the wafer surface of each region becoming the trailing surface of the individual slider. After formation of the read and write heads at the wafer level, the wafer is cut into bars and the bars cut into individual sliders. Then either the bars or the sliders are "lapped" in a plane perpendicular to the wafer surface, with this plane becoming the slider ABS.

Figure 1:
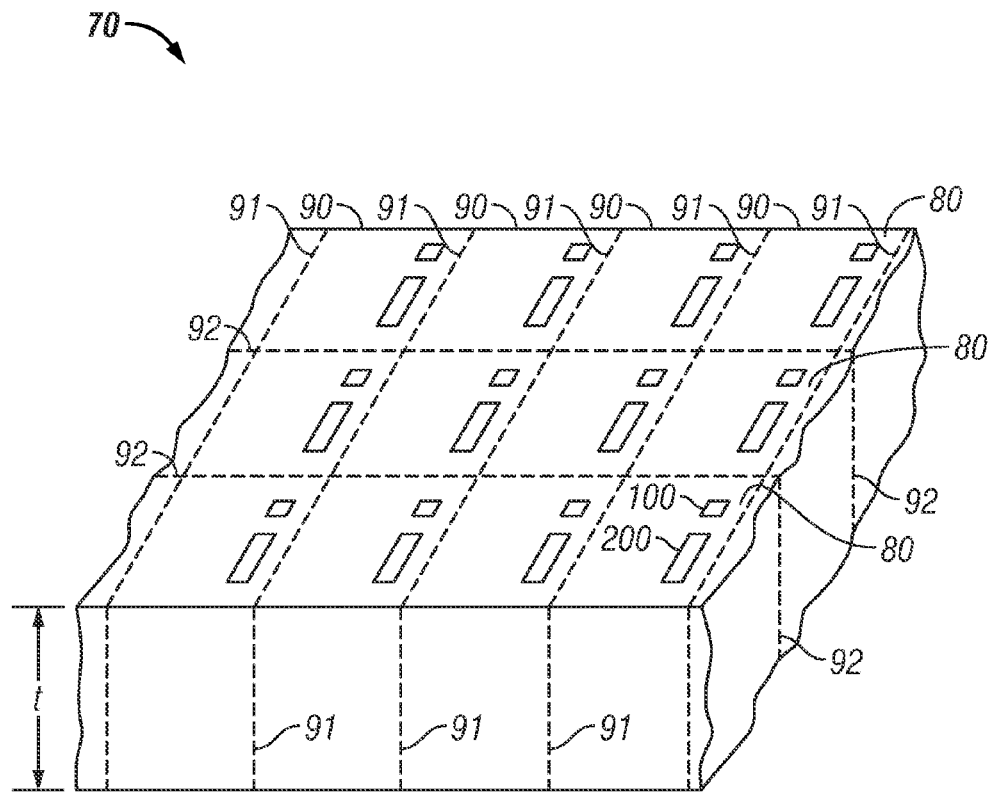
FIG. 1 is a perspective view of a portion of a wafer showing the rectangular regions or slider sections with read/write heads and electrical lapping guides (ELGs).

FIG. 1 is a perspective view of a portion of a wafer 70. The wafer 70 is typically a wafer of ceramic material, such as a composite of alumina ($Al_2O_3$) and titanium carbide (TiC), or silicon. The wafer 70 has a generally planar upper surface and a plurality of generally rectangular regions or slider sections 80 arranged in generally parallel bars 90, with each region 80 being shown bounded by dashed lines 91, 92. Each region 80 has an ELG 100 and read/write head 200 and will become an individual slider section. After all the processing steps for forming the ELGs and read and write heads, the wafer 70 is cut into bars 90 along planes represented by dashed lines 91, and the bars 90 then cut along planes represented by dashed lines 92, to form individual slider sections. The slider sections are lapped, typically at the row or bar level or alternatively at the individual slider section level, along planes parallel to planes represented by dashed lines 91, to form the individual sliders with ABS. The wafer 70 has a thickness "t" which is the "length" of the individual sliders.

Figure 2:
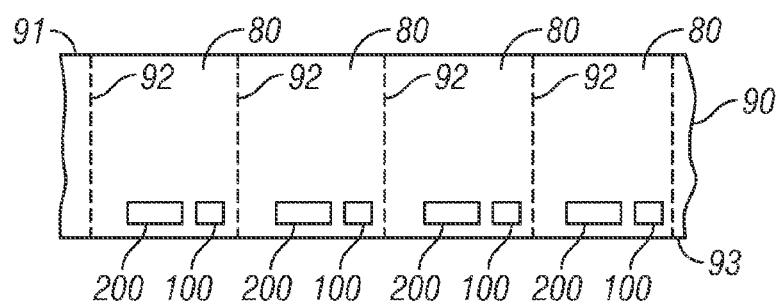
FIG. 2 is a view of the upper surface of a portion of a bar of slider sections after the bar has been cut from the wafer depicted in FIG. 1.

FIG. 2 is a view of the upper surface of a portion of a bar 90 after it has been cut from the wafer along planes corresponding to dashed lanes 91 and shows the individual slider sections 80. The bar 90 thus has a lapping surface 93, which is a surface formed after cutting along a plane corresponding to dashed line 91. Each slider section 80 has an ELG 100 and read/write head 200 recessed from lapping surface 93.

Figure 3A:
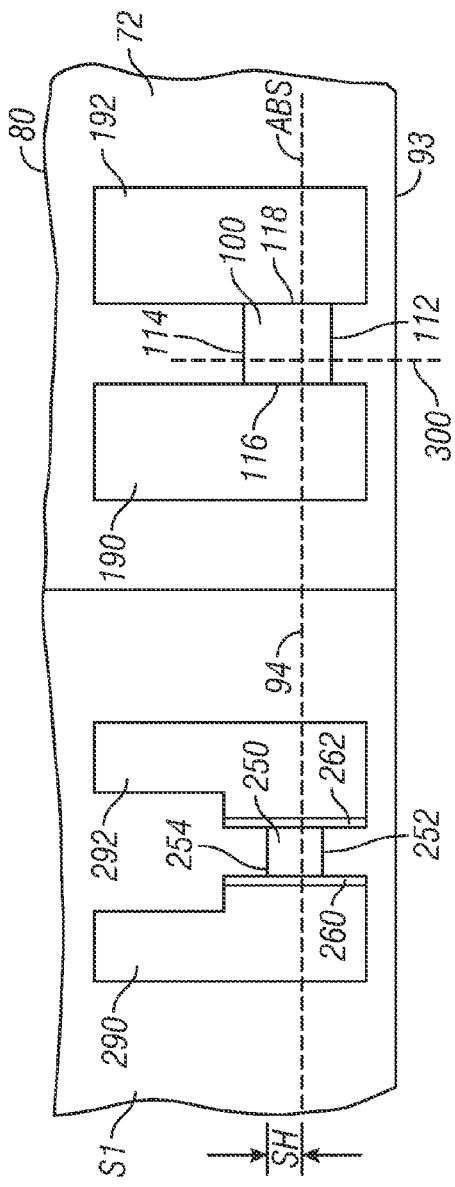
FIG. 3A is a view of the upper surface of portion of an individual slider section.
Figure 3B:
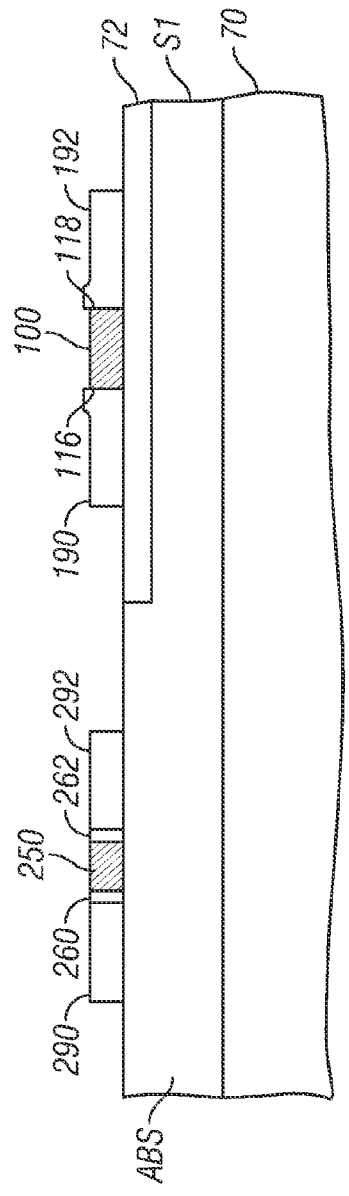
FIG. 3B is a sectional view of the slider section at the air-bearing surface (ABS) showing the ELG and only the magnetoresistive (MR) read head or sensor of the read/write head.

FIG. 3A is a view of the upper surface of portion of an individual slider section 80 and FIG. 3B is a sectional view of the slider section 80 at the ABS showing the ELG 100 and only the magnetoresistive (MR) read head or sensor 250 of the read/write head. The dashed line 94 in FIG. 3A is the edge view of the ABS, which is the plane that is formed at the completion of the lapping process. The write head is not shown for ease of illustrating the invention but is typically formed on top of the MR sensor 250. The MR sensor 250 is formed on a first magnetic shield layer 51, which is typically formed of magnetically permeable material like permalloy that is deposited on the surface of wafer 70. The MR sensor 250 is a stack of multiple layers, including a ferromagnetic sensing or "free" layer, a ferromagnetic reference layer and a nonmagnetic spacer layer. Hard magnetic biasing layers 290, 292 are located at the edges of the MR sensor 250 for biasing the magnetization of the sensor's free layer. Insulating layers 260, 262 electrically insulate the MR sensor 250 from the hard biasing layers 290, 292. The MR sensor 250 is typically a current-perpendicular-to-the-plane (CPP) sensor, meaning that the sense current is perpendicular to the planes of the layers in the sensor stack, e.g., from the top of MR sensor 250 down to the shield S1 in FIG. 3B. Shield S1 may serve as the lower electrical lead, and the upper electrical lead may be the upper magnetic shield on top of MR sensor 250 (not shown in FIGS. 3A-3B). ELG 100 is formed on an electrically insulating layer 72, such as alumina ($Al_2O_3$), that is deposited on S1 and electrically isolates ELG 100 from MR sensor 250. ELG 100 is connected at each of its side edges 116, 118 to electrical leads 190, 192. MR sensor 250 has a front edge 252 recessed from lapping surface 92 and a back edge 254 generally parallel to front edge 252. Similarly, ELG 100 has a front edge 112 recessed from lapping surface 92 and a back edge 114 generally parallel to front edge 112. The back edge 114 of ELG 100 is depicted as being located farther from lapping surface 92 than MR sensor back edge 254, but back edges 114 and 254 could be located along the same line.

The dashed line 94 in FIG. 3A is an edge view of the ABS and is the plane where lapping is stopped. The spacing between line 94 and back edge 254 of MR sensor 250 is the sensor stripe height (SH) which is the desired optimal dimension for the MR sensor. To achieve this SH, the electrical resistance of ELG 100 is monitored and lapping is terminated when the monitored resistance reaches a predetermined value corresponding to the desired SH for MR sensor 250. The lapping tool, which removes the slider material in the direction orthogonal to lapping plane 92, and the lapping monitor or controller, which measures the electrical resistance and controls the lapping tool, are well-known in the art and thus not depicted in FIGS. 3A-3B.

Figure 4:
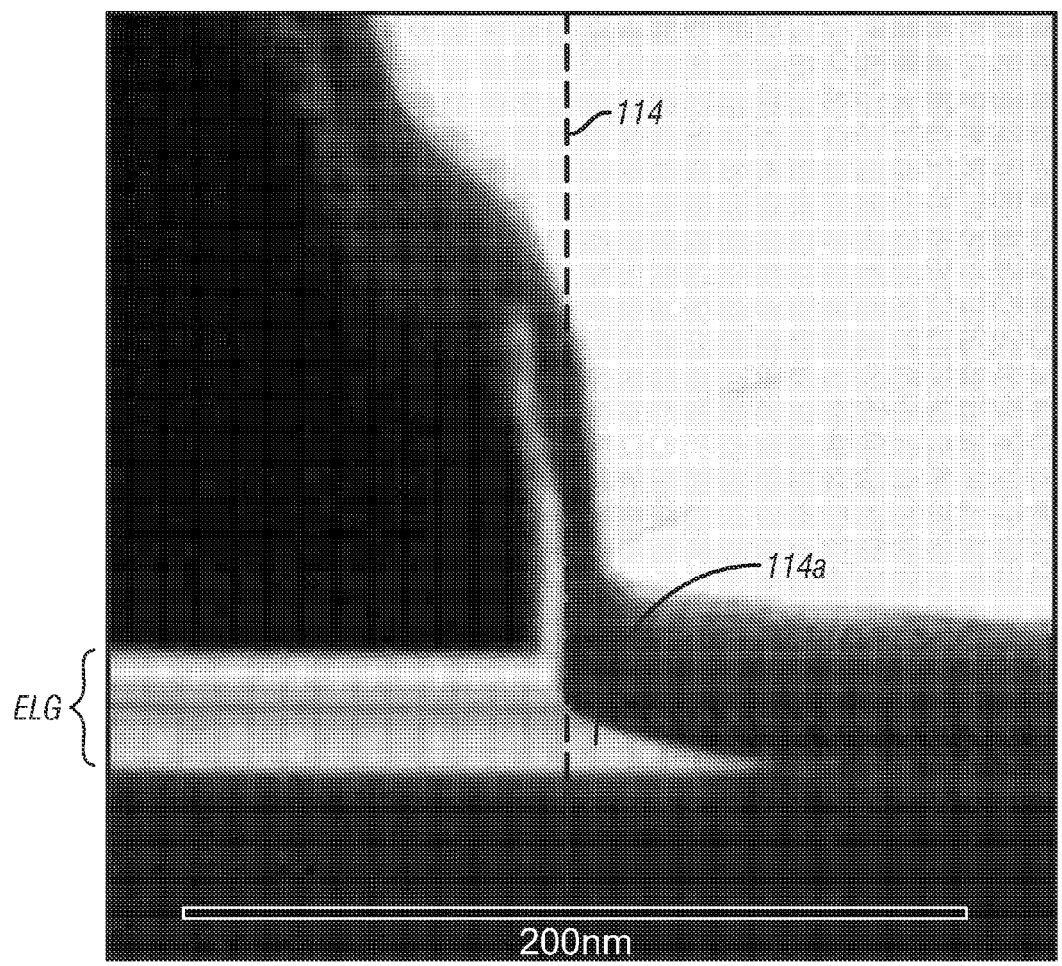
FIG. 4 is a Scanning Transmission Electron Microscope (STEM) image of a sectional view along plane 300 of FIG. 3A and shows the back edge of a prior art ELG that is formed of the same set of materials as the MR sensor.

The ELG 100 typically lies in the same plane, is formed of the same set of multilayered materials, and is formed at the same time as the MR sensor 250, which simplifies the manufacturing process. Because the ELG and MR sensor are typically formed of the same materials and in the same process, they will have the same thickness and same electrical resistivity ($\rho$). Also, because the back edges 114, 254 of ELG 100 and MR sensor 250, respectively, are formed at the same time in the same etching step, the ELG and MR sensor will have the same etch rate so that their respective back edges will have the same profile. FIG. 4 is a Scanning Transmission Electron Microscope (STEM) image of a sectional view along a plane represented by dashed line 300 of FIG. 3A and shows the back edge 114 of a prior art ELG that is formed of the same set of materials as MR sensor 250. This view is after etching and shows a high taper profile 114a, which may be desirable for the back edge 254 of MR sensor 250, but is undesirable for the back edge 114 of ELG 100. A tapered back edge results in an unpredictable surface area for the ELG, and because the current through the ELG is in the plane of the ELG can result in unpredictable electrical resistance.

This invention is an ELG, like ELG 100 described above and shown in FIGS. 3A-3B, but wherein the ELG is formed of a different material than the MR sensor so as to have both a high electrical resistivity $\rho$ and a substantially higher etch rate. The ELG material also has a low temperature coefficient of resistivity $\rho(T)$, which results in a stable resistance measurement during heating caused by the lapping process, and a high corrosion resistance, which prevents corrosion during the wet lapping process. Because the ELG material has a substantially higher rate of etching or ion milling than the material of the MR sensor, when the ELG and MR sensor are ion milled simultaneously to form their respective back edges, the ELG will be fully milled at the back edge, resulting in a sharp well-defined non-tapered wall at the back edge.

The ELG is preferably an alloy comprising silver (Ag) and tin (Sn), wherein Sn is present in amount greater than 3 atomic percent. The shield layer S1 and the layers making up the MR sensor 250 are deposited on the slider sections of the wafer and then masked. In one approach, as shown in FIGS. 3A-3B, the area adjacent the MR sensor where the ELG is to be formed is etched down through at least a portion of S1, after which the insulating layer 72 and ELG material is deposited adjacent the MR sensor. Alternatively, the ELG material may be formed directly on a section of the wafer 70 where there is no S1 material, so there would be no need for insulating material 72. The ELG material may be co-sputtered from Ag and Sn targets or sputtered from a single target with the desired composition. The MR sensor layers and the ELG material are then lithographically patterned to define their respective back edges, after which the MR sensor materials and ELG material are simultaneously ion milled, typically by an argon ion source.

Figure 5:
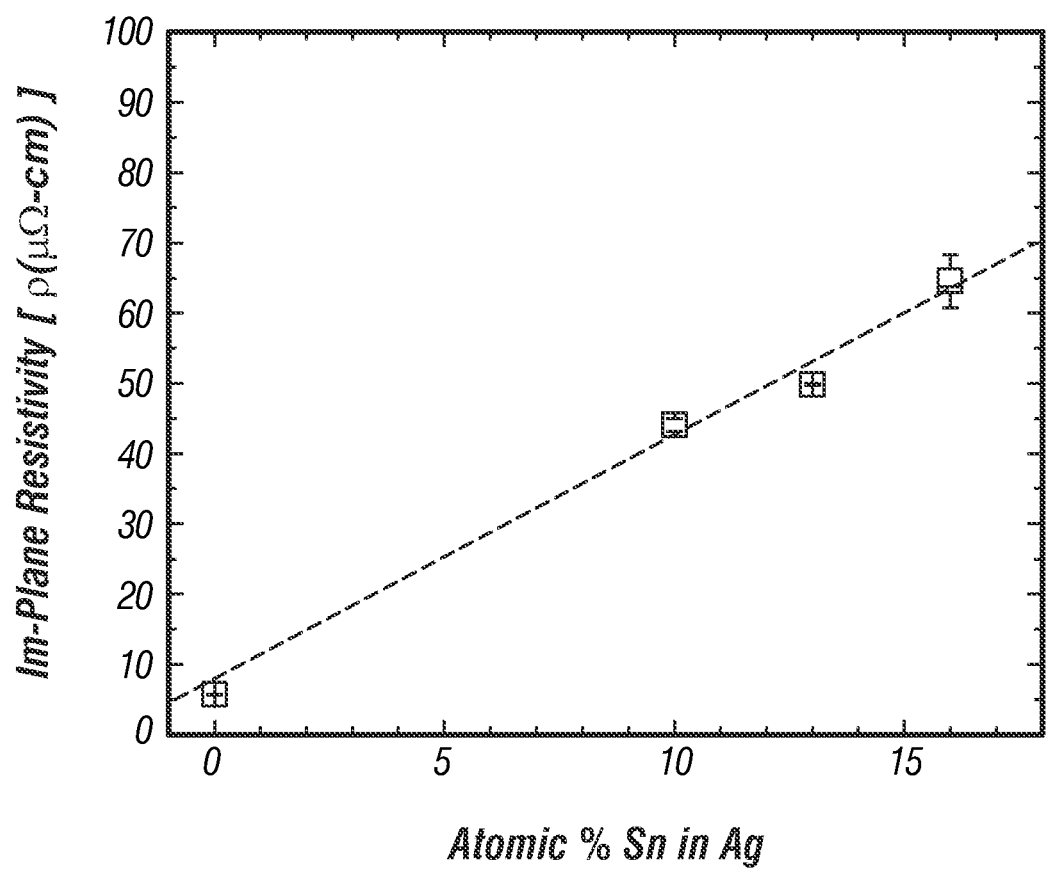
FIG. 5 is a graph of in-plane resistivity for a AgSn film as a function of Sn atomic percent (at. %).

FIG. 5 is a graph of in-plane resistivity for a AgSn film as a function of Sn atomic percent (at. %). The resistivity is essentially linear and ranges from about 15 $\mu\Omega$-cm at 3 at. % Sn to about 70 $\mu\Omega$-cm at 18 at. % Sn, which is considerably higher than the resistivity of Ag, which is about 5 $\mu\Omega$-cm. The amount of Sn can be selected to achieve the desired electrical resistance for the ELG. For example, the ELG may have a film thickness close to but generally thinner than that of the MR sensor, for example typically in the range of about 150-250 Å. Then if it is desired to achieve a sheet resistance for the ELG of at least 20 $\Omega$/square so as to generally match the resistance measurement capability of the lapping tool, the resistivity should be at least about 37.5 $\mu\Omega$-cm for a 150 Å film and 62.5 $\mu\Omega$-cm for a 250 Å film. From FIG. 5, the Sn amount should then preferably be at least about 9 at. % and 16 at. %, respectively.

Figure 6:
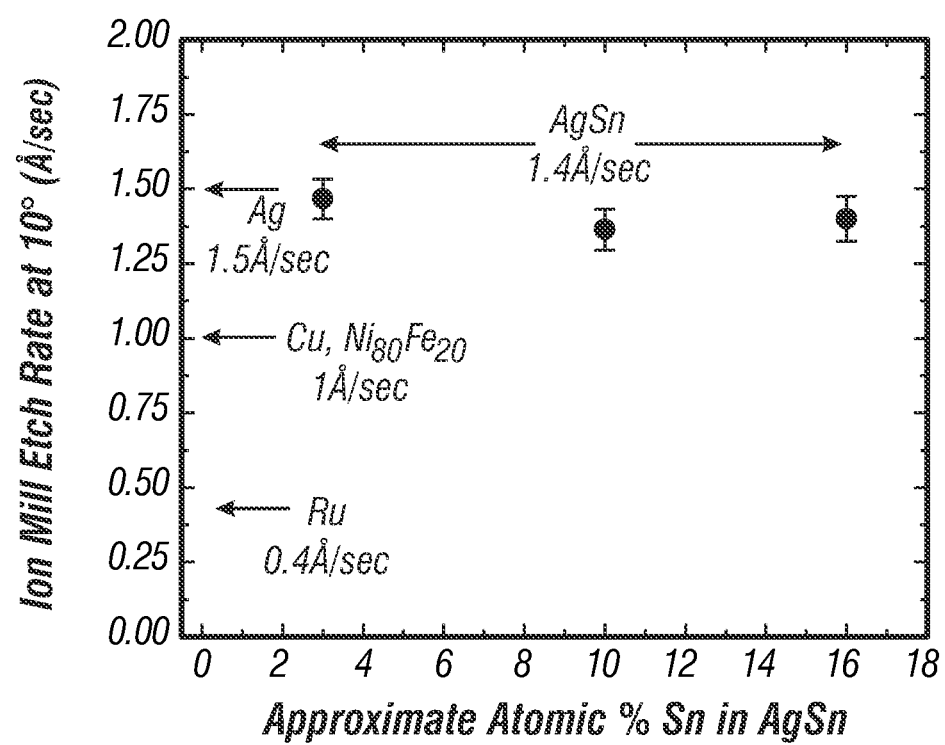
FIG. 6 is a graph of etch rate for a AgSn film as a function of Sn at. % and shows the etch rate for three typical materials used in MR sensors.

FIG. 6 is a graph of etch rate for a AgSn film as a function of Sn at. % and shows the etch rate for three typical materials used in MR sensors. The AgSn etch rate is between about 1.3 to 1.45 Å/sec over the range of 3-16 at. % Sn. This is substantially higher than for three typical materials used in MR sensors, e.g., 1.0 Å/sec for copper (Cu) and a NiFe ferromagnetic alloy, and 0.4 Å/sec for ruthenium (Ru). Also, the addition of Sn to Ag in the preferred range does not significantly reduce the high etch rate from that of Ag, which is about 1.5 Å/sec. The high mill rate for the AgSn ELG, which is between 50-200% higher than typical MR sensor materials, results in a back edge with a sharp non-tapered wall that is essentially orthogonal to the plane of the ELG. The Sn amount should not exceed a certain percentage (approximately 20 at. %), because beyond that amount the AgSn alloy is no longer single-phase and several crystalline phases of different Sn compositions will co-exist in the film. This reduces the resistivity, and therefore is not desirable.

Figure 7:
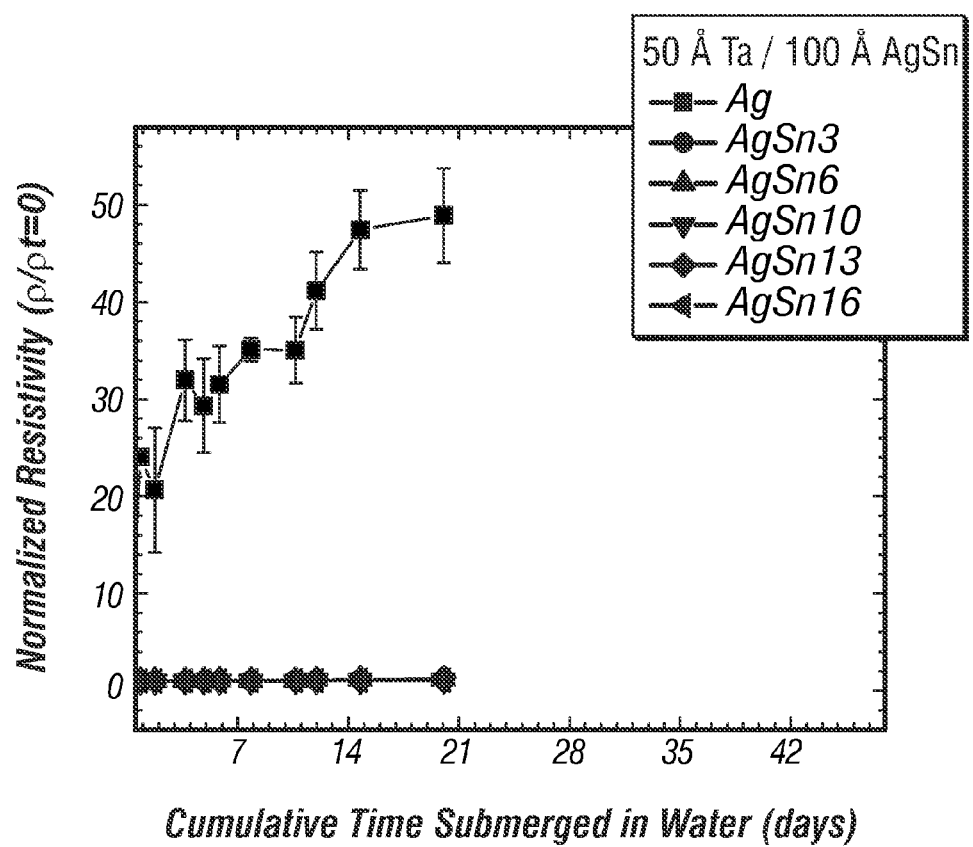
FIG. 7 is a graph showing corrosion resistance, as measured by a change in resistivity, for Ag and for various AgSn alloys, after exposure to water.

FIG. 7 is a graph showing corrosion resistance, as measured by a change in resistivity, for Ag and for various AgSn alloys, after exposure to water. The AgSn films were 100 Å thick and deposited on a 50 Å thick tantalum (Ta) film. The exposure to water causes a significant change in resistivity of Ag over a period of about 20 days. However, only a small addition of Sn (3 at. %) results in no change in resistivity for water exposure over the same time period.

While the ELG according to the invention has been described as an alloy comprising silver (Ag) and tin (Sn), other materials may be substituted for Sn or added to Sn. Thus the ELG may be formed of an alloy comprising Ag and X, where X is one or more of Sn, germanium (Ge) and zinc (Zn). Thus the ELG material may be the binary alloys AgSn, AgGe and AgZn. The specific added elements and their at. % can be selected based on the known properties of the elements, such as increased resistivity and corrosion resistance. However, based on the above-described properties and data for AgSn, the amount of X is at least 3 at. % and preferably at least 9 at. %, and preferably no greater than about 20 at. %.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An air-bearing slider that supports a read/write head in a magnetic recording disk drive, the slider having a generally planar upper surface and an air-bearing surface (ABS) generally orthogonal to said upper surface, the slider comprising:
   a magnetoresistive sensor directly on the upper surface, the sensor being formed of a stack of multiple layers and having a front edge at the ABS and a back edge recessed from said sensor front edge, the sensor back edge having a planar portion generally parallel to the sensor front edge and substantially orthogonal to the upper surface and a tapered portion nonparallel to the sensor front edge and the upper surface and connecting the upper surface to the planar portion of the sensor back edge; and
   an electrical lapping guide (ELG) on the upper surface adjacent to the sensor and having a front edge at the ABS and a back edge generally parallel to and recessed from said ELG front edge and substantially orthogonal to the upper surface, the ELG being formed of an alloy comprising Ag and one or more of Sn, Ge and Zn.

2. The slider of claim 1 wherein said alloy comprises Ag and Sn, wherein Sn is present in an amount greater than or equal to 3 atomic percent and less than or equal to 20 atomic percent.

* * * * *